(12) United States Patent
Kanaoka (10) Patent No.: US 9,308,986 B2
(45) Date of Patent: Apr. 12, 2016

(54) FLOATING MOBILE OBJECT AND FLOATING MOBILE SYSTEM USING THE SAME

(71) Applicant: The Ritsumeikan Trust, Kyoto (JP)

(72) Inventor: Katsuya Kanaoka, Shiga (JP)

(73) Assignee: The Ritsumeikan Trust, Kyoto (JP)

( * ) Notice: Subject to any disclaimer, the term of this patent is extended or adjusted under 35 U.S.C. 154(b) by 57 days.

(21) Appl. No.: 14/385,506

(22) PCT Filed: Feb. 14, 2013

(86) PCT No.: PCT/JP2013/053557
§ 371 (c)(1),
(2) Date: Dec. 22, 2014

(87) PCT Pub. No.: WO2013/136902
PCT Pub. Date: Sep. 19, 2013

(65) Prior Publication Data
US 2015/0108282 A1    Apr. 23, 2015

(30) Foreign Application Priority Data

Mar. 16, 2012    (JP) ................................. 2012-060598

(51) Int. Cl.
*B64C 15/12*    (2006.01)
*B63H 25/04*    (2006.01)
(Continued)

(52) U.S. Cl.
CPC ................ *B64C 15/12* (2013.01); *B63H 25/04* (2013.01); *B63H 25/46* (2013.01); *B64C 39/024* (2013.01);
(Continued)

(58) Field of Classification Search
CPC .............................. B64C 15/12; B64C 39/024
See application file for complete search history.

(56) References Cited

U.S. PATENT DOCUMENTS 6,886,776 B2 *  5/2005  Wagner ..................... B64C 3/56
                                                                244/12.1
8,590,828 B2 * 11/2013  Marcus .............. B64C 29/0058
                                                                244/1 R
(Continued)

FOREIGN PATENT DOCUMENTS

JP    04354275    12/1992
JP    06335876    12/1994
(Continued)

OTHER PUBLICATIONS

R.W. Brockett, "Asymptotic Stability and Feedback Stabilization", in Differential Geometric Control Theory, pp. 181-191, 1983.
(Continued)

*Primary Examiner* — Justin Benedik
(74) *Attorney, Agent, or Firm* — Kirschstein, Israel, Schiffmiller & Pieroni, P.C.

(57) ABSTRACT

A holonomic floating mobile object is operated under gravity and includes a main body and six or more thrusters for generating thrust by changing the momentum of a fluid. The six or more thrusters are controlled independently of one another such that the thrust is set at a desired value. The six or more thrusters are arranged in a fuselage coordinate system defined on the main body, such that the range in which a total thrust vector obtained by combining vectors of the thrust generated by all of the thrusters can be generated spans a six-dimensional space with three directions of translation and three directions of rotation. Incoming and outgoing flows to and from one of the thrusters are spaced apart from incoming and outgoing flows to and from the other thrusters and even apart from every other fuselage structure aside from that one thruster.

11 Claims, 6 Drawing Sheets

(51) Int. Cl.
B64C 39/02 (2006.01)
G05D 1/10 (2006.01)
B63H 25/46 (2006.01)
B63B 35/00 (2006.01)

(52) U.S. Cl.
CPC ............ *G05D 1/10* (2013.01); *B63B 2035/008* (2013.01); *B63H 2025/465* (2013.01); *B64C 2201/027* (2013.01); *B64C 2201/10* (2013.01); *B64C 2201/146* (2013.01)

(56) References Cited

U.S. PATENT DOCUMENTS

| | | | | |
|---|---|---|---|---|
| 8,886,371 | B2* | 11/2014 | Peters | G05D 1/0858 244/12.4 |
| 2006/0226281 | A1* | 10/2006 | Walton | B64C 29/0033 244/17.23 |
| 2009/0008499 | A1* | 1/2009 | Shaw | B64C 27/20 244/17.23 |
| 2011/0042510 | A1* | 2/2011 | Bevirt | B64C 29/0033 244/12.4 |
| 2011/0226892 | A1* | 9/2011 | Crowther | B64C 1/30 244/17.23 |
| 2012/0043413 | A1* | 2/2012 | Smith | B64C 29/0033 244/12.4 |
| 2012/0152654 | A1* | 6/2012 | Marcus | A62B 5/00 182/129 |

FOREIGN PATENT DOCUMENTS

| | | |
|---|---|---|
| JP | 11353021 | 12/1999 |
| JP | 2003312592 | 11/2003 |
| JP | 2007118702 | 5/2007 |
| JP | 2010231290 | 10/2010 |
| JP | 2011245944 | 12/2011 |

OTHER PUBLICATIONS

S.K. Choi, et al.,"Design of Omni-Directional Underwater Robotic Vehicle", in OCEANS '93, vol. 1, pp. 1192-1197, 1993.

* cited by examiner

FLOATING MOBILE OBJECT AND FLOATING MOBILE SYSTEM USING THE SAME

TECHNICAL FIELD

The present invention relates to a floating mobile object including a plurality of thrusters for generating thrust, and a floating mobile system using the same.

BACKGROUND ART

Most of the conventional floating mobile objects (such as airplanes, helicopters, and submersibles) that are operated in the air or under water are underactuated systems with the range in which the total thrust vector obtained by combining all vectors of the thrust generated by thrusters can be generated is less than six dimensions, and such a conventional floating mobile object is equipped with a rudder for allowing movement in a six-dimensional space. Such a floating mobile object that is not holonomic (referred to below as a nonholonomic floating mobile object) is not required to generate thrust in every direction of the six-dimensional space, and therefore, the thrust efficiency of the thruster is high. This is advantageous particularly under gravity, in which upward force is always required for floating. However, such a nonholonomic floating mobile object has issues in that its frame structure and control law are complicated.

More specifically, since the nonholonomic floating mobile object is provided with a rudder, mechanisms for moving and controlling the rudder are required, resulting in a complicated frame structure. This is problematic particularly to relatively small-sized floating mobile objects.

Furthermore, Brockett's theorem suggests that the nonholonomic system is not capable of achieving asymptotic stability to an equilibrium point by a smooth time-invariant feedback control law (see Non-Patent Document 1), and therefore, it can be appreciated that the nonholonomic floating mobile object cannot be controlled stably by, for example, a simple PD control law alone. Accordingly, the nonholonomic floating mobile object requires, for example, hierarchization and switching of control laws.

For example, a helicopter or a quadrotor can generate thrust only upward but not laterally when the fuselage is hovering horizontally. Accordingly, in the case where a helicopter or a quadrotor moves horizontally from the state of hovering, it is necessary to take a plurality of steps of, in response to a single command to move horizontally, inclining the fuselage (or a propeller(s)) and thereafter generating horizontal thrust. Furthermore, in the case where the fuselage is in a crosswind during horizontal hovering, to continue the hovering in a fixed position, it is necessary, as in the above, to take a plurality of steps of inclining the fuselage (or a propeller(s)) and thereafter generating horizontal thrust, which results in a late response to crosswind. Therefore, the control law for the nonholonomic floating mobile object becomes complicated, and further, if there is disturbance such as wind, control performance is reduced.

Accordingly, to solve the issues with the nonholonomic floating mobile object, floating mobile objects that are holonomic (referred to below as holonomic floating mobile objects) have been proposed (see, for example, Non-Patent Document 2 and Patent Documents 1 and 2).

Non-Patent Document 2 discloses an ODIN (Omni-Directional Intelligent Navigator), which is a holonomic floating mobile object including eight thrusters controlled independently of one another. Patent Document 1 discloses a holonomic floating mobile object which includes six thrusters controlled independently of one another and generating thrust in different directions from one another. All of these holonomic floating mobile objects are used under water where the effect of gravity is cancelled out by flotation, and therefore, low thrust efficiency of the thruster, which is a disadvantage of the holonomic system, is negligible. Accordingly, the holonomic floating mobile objects can apply high control performance, which is an advantage of the holonomic system.

Patent Document 2 discloses a hybrid airship, which is a holonomic floating mobile object including a balloon and a plurality of thrusters controlled independently of one another. In this hybrid airship, the effect of gravity is cancelled out by flotation of the balloon, and therefore, as in the case of the holonomic floating mobile objects that are used under water, low thrust efficiency of the thruster, which is a disadvantage of the holonomic system, is negligible. Accordingly, the hybrid airship can also apply high control performance, which is an advantage of the holonomic system.

PRIOR ART DOCUMENTS

Patent Documents

Patent Document 1: Japanese Laid-Open Patent Publication No. 2007-118702
Patent Document 2: Japanese Laid-Open Patent Publication No. 2011-245944

Non-Patent Documents

Non-Patent Document 1: R. W. Brockett, "Asymptotic Stability and Feedback Stabilization," in Differential Geometric Control Theory, R. W. Brockett, R. S. Millman, and H. J. Sussmann, eds., pp. 181-191, Birkhaeuser, Boston, 1983.
Non-Patent Document 2: S. K. Choi, J. Yuh, and N. Keevil, "Design of Omni-Directional Underwater Robotic Vehicle," OCEANS '93, vol. 1, pp. 1192-1197, 1993.

DISCLOSURE OF THE INVENTION

Problems to be Solved by the Invention

Incidentally, to fully utilize the advantage of the holonomic system having high control performance, it is necessary to control a total thrust vector with high accuracy by operating the thrusters. In the case of the holonomic floating mobile object, the more linear the relationship between the thrust of each thruster and a total thrust vector actually generated becomes, the higher the accuracy of controlling the total thrust vector becomes, leading to improved control performance.

However, in the conventional holonomic floating mobile objects described above, the thrusters are arranged such that their axes of thrust cross one another, and therefore, airflows from the thrusters (or airflows to the thrusters) interfere with one another. The thruster is a means of providing thrust in reaction to variations in momentum of a fluid, so that the thrust generated by the thruster is affected by nonlinear dynamics of the fluid, and if the airflows from/to the thrusters interfere with one another, variations in momentum of a fluid are affected in an unpredictable manner.

Accordingly, in the conventional holonomic floating mobile objects described above, the relationship between the thrust of each thruster and a total thrust vector actually generated becomes more nonlinear, and therefore, the total thrust vector cannot be controlled with high accuracy, so that the advantage of the holonomic system having high control performance cannot be fully utilized.

The present invention has been achieved under the above circumstances, with a problem thereof being to provide a holonomic floating mobile object capable of controlling a total thrust vector with high accuracy as well as a floating mobile system using the same.

Solution to the Problems

To solve the above problem, the present invention provides (1) a floating mobile object operated under gravity, including a main body and six or more thrusters for generating thrust by changing the momentum of a fluid, the six or more thrusters are controlled independently of one another such that the thrust is set at a desired value, and the six or more thrusters are arranged in a fuselage coordinate system defined on the main body, such that a range in which a total thrust vector obtained by combining vectors of the thrust generated by all of the thrusters is generated spans a six-dimensional space with three directions of translation and three directions of rotation, and incoming and outgoing flows to and from one of the thrusters are spaced apart from incoming and outgoing flows to and from the other thrusters and even apart from every other fuselage structure aside from said one thruster.

In this configuration, the thrusters are arranged such that the range in which the total thrust vector can be generated spans a six-dimensional space with three directions of translation and three directions of rotation, and incoming and outgoing flows to and from one of the thrusters are spaced apart from incoming and outgoing flows to and from the other thrusters and even apart from every other fuselage structure aside from that one thruster, and therefore, it is possible to construct a holonomic system and also possible to allow the thrust of each thruster and a total thrust vector actually generated to be approximated to a linear relationship. Thus, with this configuration, it is possible to control the total thrust vector with high accuracy.

Moreover, when considering a holonomic floating mobile object in the air under gravity which defies gravity mainly by the thrust of the thrusters without depending on flotation, to compensate for low thrust efficiency of the thrusters, it is advantageous to direct the primary thrust vector of each thruster mainly upward in the vertical direction, and in the above configuration, the thrusters can be arranged such that the total thrust vector spans a six-dimensional space by directing the primary thrust vectors of the thrusters mainly upward in the vertical direction but in slightly different directions from one another, and the incoming and outgoing flows to and from the thrusters do not interfere with one another. Thus, with this configuration, it is possible to compensate for low thrust efficiency of the thruster, which is a disadvantage of the holonomic system, and apply high control performance, which is an advantage of the holonomic system, even when the floating mobile object is in the air under gravity and defies gravity mainly by the thrust of the thrusters without depending on flotation.

When considering the risk of thruster failure, in the floating mobile object in (1) above, it is preferable that (2) the number of thrusters provided is $6+\alpha$, $\alpha$ being a positive integer, and $(6+\alpha-\beta)$ thrusters, $\beta$ being a positive integer less than or equal to $\alpha$, excluding $\beta$ from among the $(6+\alpha)$ thrusters, are arranged such that the range in which the total thrust vector obtained by combining the vectors of the thrust generated by all of the thrusters can be generated spans the six-dimensional space regardless of the selection of the $\beta$ thrusters and whichever $\beta$ thrusters are selected.

Generally, in the case of a floating mobile object for which the effect of gravity cannot be cancelled out, if any one thruster stops, it becomes difficult to maintain the position and the orientation of the fuselage, leading to a risk of fall. However, the above configuration renders it possible to keep the holonomic system and thereby reduce the risk of fall even if up to arbitrary $\beta$ thrusters from among the $(6+\alpha)$ thrusters stop at the same time.

In the floating mobile object in (1) or (2) above, (3) the thrust generated by the thrusters can be controlled on the basis of commands outputted by one or more input means and one or more sensors provided in the main body.

In the case of the holonomic floating mobile object, the range in which the total thrust vector can be generated spans a six-dimensional space in three directions of translation and three directions of rotation, and therefore, an operation with these six degrees of freedom needs to be performed by some method. If all steps of such an operation with six degrees of freedom are assigned to the operator, the operator needs to have extremely advanced operation skills because of such a large number of degrees of freedom to be dealt with at the same time, and therefore, in some cases, the operator's intuitive understanding might be surpassed so that the operator cannot perform the operation. However, with the above configuration, the thrust is controlled on the basis of the commands outputted by the input means and the sensors, and therefore, it is possible to reduce the level of the operation skills to be required for the operator, so that the operator can be prevented from operational failures.

In the floating mobile object in (3) above, (4) the command outputted by the input means is conceivably an input signal outputted by an operating console manipulated remotely by an operator, and (5) the command outputted by the sensor is conceivably at least one measured value for the main body's position, orientation, velocity, angular velocity, acceleration, and angular acceleration.

Further, (6) the command outputted by the input means may include a measured value outputted by a sensor for measuring an orientation of the operator's specific body part.

In this case, the operator can perform an intuitive operation of changing the orientation of his/her specific body part, and therefore, it is possible to reduce the level of the operation skills required for the operator.

In the case where the operator performs a remote operation, it is conceivable that (7) the floating mobile object in (1) or (2) above further includes a camera provided on the main body, and the camera is capable of outputting a video being taken to a video display device used by the operator in real-time.

With this configuration, a video taken by the camera provided on the main body is outputted in real-time to the video display device used by the operator, and therefore, the operator can perform operations from the viewpoint in the coordinate system of the floating mobile object (i.e., the fuselage coordinate system defined on the main body). That is, with this configuration, it is possible to solve operational complexities due to mismatch between the operator's coordinate system and the floating mobile object's coordinate system.

In the floating mobile object in (7) above, it is preferable that (8) the camera be provided pivotably on the main body.

With this configuration, the direction of the camera can be decided independently of the orientation of the main body, so that it is possible to provide the operator with a wider field of view.

Further, (9) the camera can be adapted such that its pivot angle can be controlled on the basis of a measured value outputted by a sensor for measuring a head orientation of the operator.

This configuration allows the operator to decide the direction of the camera by an intuitive operation of changing his/her head orientation, and therefore, it is possible to provide the operator with a wider field of view without increasing operational complexities.

Further, to solve the above problem, the present invention provides (10) a floating mobile system using a floating mobile object in (1) or (2) above, including an operating console manipulated remotely by an operator, an acceleration sensor for measuring acceleration of the floating mobile object, an orientation sensor for measuring an orientation of the floating mobile object, and a control portion for deciding target acceleration for the floating mobile object on the basis of an input signal outputted by the operating console and also deciding a target total thrust vector in a direction of translation for realizing the target acceleration, on the basis of measured values outputted by the acceleration sensor and the orientation sensor, and the thrusters are controlled independently of one another such that the total thrust vector matches the target total thrust vector in the direction of translation.

It is preferable that (11) the floating mobile system in (10) above further includes a turning angle sensor for measuring an orientation of the operator's specific body part, and an angular velocity sensor for measuring an angular velocity of the floating mobile object, the control portion decides a target orientation for the floating mobile object on the basis of a measured value outputted by the turning angle sensor and also decides a target total thrust vector in a direction of rotation for realizing the target orientation, on the basis of measured values outputted by the angular velocity sensor and the orientation sensor, and the thrusters are controlled independently of one another such that the total thrust vector matches a target total thrust vector obtained by combining the target total thrust vectors in the directions of translation and rotation.

The above configurations render it possible to control the total thrust vector of the floating mobile object with high accuracy without increasing operational complexities.

DEFINITIONS OF TERMS

The term "floating mobile object" herein refers to an artificial mobile object that floats in the air or under water. The "floating mobile object" is basically separated from a fixed point such as the ground or a building or another mobile object. However, the "floating mobile object" may be connected with a power supply or communication cable or with a cable, spring, or the like, which supports a part or all of the weight of the fuselage to save thrust, so long as it can move in a six-dimensional space.

The term "under gravity" herein refers to an environment in which the effect of gravity on motion is sufficiently large to be conspicuous. That is, the term "under gravity" herein does not encompass so-called "under microgravity".

The term "thruster" herein is a generic term for the means of providing thrust in reaction to variations in momentum of a fluid. Examples of the "thruster" include a propeller, a screw, a fan, a jet engine, and a rocket engine.

The term "primary thrust" herein refers to a translational composition of the thrust generated by the thruster along the axis of thrust, and the term "secondary thrust" herein refers to the remaining composition of the thrust generated by the thruster, aside from the primary thrust. For example, in the case where a propeller is used as the thruster, once the propeller rotates, the "primary thrust" is generated in the direction of the rotational axis of the propeller (i.e., the axis of thrust) and applied to the fuselage as a translational force, whereas torque is generated so as to rotate the main body about the axis of rotation of the propeller in the opposite direction to the rotation of the propeller, the torque being the "secondary thrust". Note that when the term "thrust" is simply used, it refers to the sum of the "primary thrust" and the "secondary thrust".

The term "total thrust" herein refers to the total thrust of all thrusters arranged on the floating mobile object (or all of the thrusters that are operating normally).

Effect of the Invention

In the present invention, the thrusters are arranged such that the range in which the total thrust vector can be generated spans a six-dimensional space with three directions of translation and three directions of rotation, and incoming and outgoing flows to and from one of the thrusters are spaced apart from incoming and outgoing flows to and from the other thrusters and even apart from every other fuselage structure aside from that one thruster, and therefore, the thrust of each thruster and a total thrust vector actually generated can be approximated to a linear relationship, whereby it is possible to provide a holonomic floating mobile object capable of controlling the total thrust vector with high accuracy as well as a floating mobile system using the same.

BRIEF DESCRIPTION OF THE DRAWINGS

FIG. 1 provides (a) a top view, (b) an oblique view, and (c) a side view of a floating mobile object according to a first embodiment of the present invention.

FIG. 2 provides (a) a front view and (b) a bottom view of the floating mobile object according to the first embodiment of the present invention, as well as (c) an oblique view illustrating incoming and outgoing flows to and from a thruster $S_1$ being spaced apart from incoming and outgoing flows to and from every other thruster and even apart from every other fuselage structure aside from the thruster $S_1$.

FIG. 5 provides (a) a top view, (b) an oblique view, and (c) a side view of a floating mobile object according to a second embodiment of the present invention.

FIG. 6 provides (a) a front view and (b) a bottom view of the floating mobile object according to the second embodiment of the present invention, as well as (c) an oblique view illustrating incoming and outgoing flows to and from a thruster $S_1$ being spaced apart from incoming and outgoing flows to and from every other thruster and even apart from every other fuselage structure aside from the thruster $S_1$.

MODE FOR CARRYING OUT THE INVENTION

Hereinafter, preferred embodiments of a floating mobile object according to the present invention and a floating mobile system using the same will be described with reference to the accompanying drawings, regarding examples where the floating mobile object is used in the air under gravity.

Note that in the following, a reference frame fixed in an absolute position in an inertial frame (approximate to the surface of the Earth) is denoted by $\Sigma_R$, a fuselage coordinate system fixed at the main body of a floating mobile object and having its origin at the position of the center of gravity in the floating mobile object is denoted by $\Sigma_B$, and an effector coordinate system in which forces of primary thrust generated by effectors (thrusters) are put together is denoted by $\Sigma_E$. Vectors and matrixes are represented by the fuselage coordinate system $\Sigma_B$ in accordance with customary practices of dynamics analysis of floating mobile objects. However, vectors with a superscript on the left side are represented by the coordinate system corresponding to the superscript.

Furthermore, variables are defined as follows:

$J_{EB} \in \Re^{n \times 6}$ Jacobian matrix to transform a velocity in $\Sigma_B$ to a velocity in $\Sigma_E$;

$^E u_E(t) \in \Re^n$ Primary thrust vector obtained by adding up the primary thrust generated by the thrusters;

$u_E(t) \in \Re^6$ Representation of resultant thrust/moment (total thrust vector) generated by all of the thrusters in $\Sigma_B$;

$^E u_{Ed}(t) \in \Re^n$ Target value for the primary thrust vector $^E u_E(t)$; and $u_{Ed}(t) \in \Re^6$ Target value for the total thrust vector $u_E(t)$.

In the above variables, "6" is the number of dimensions of a space in which the floating mobile object moves, "n" is the number of thrusters (where n≥6), and "t" is the time.

First Embodiment

Figure 1:
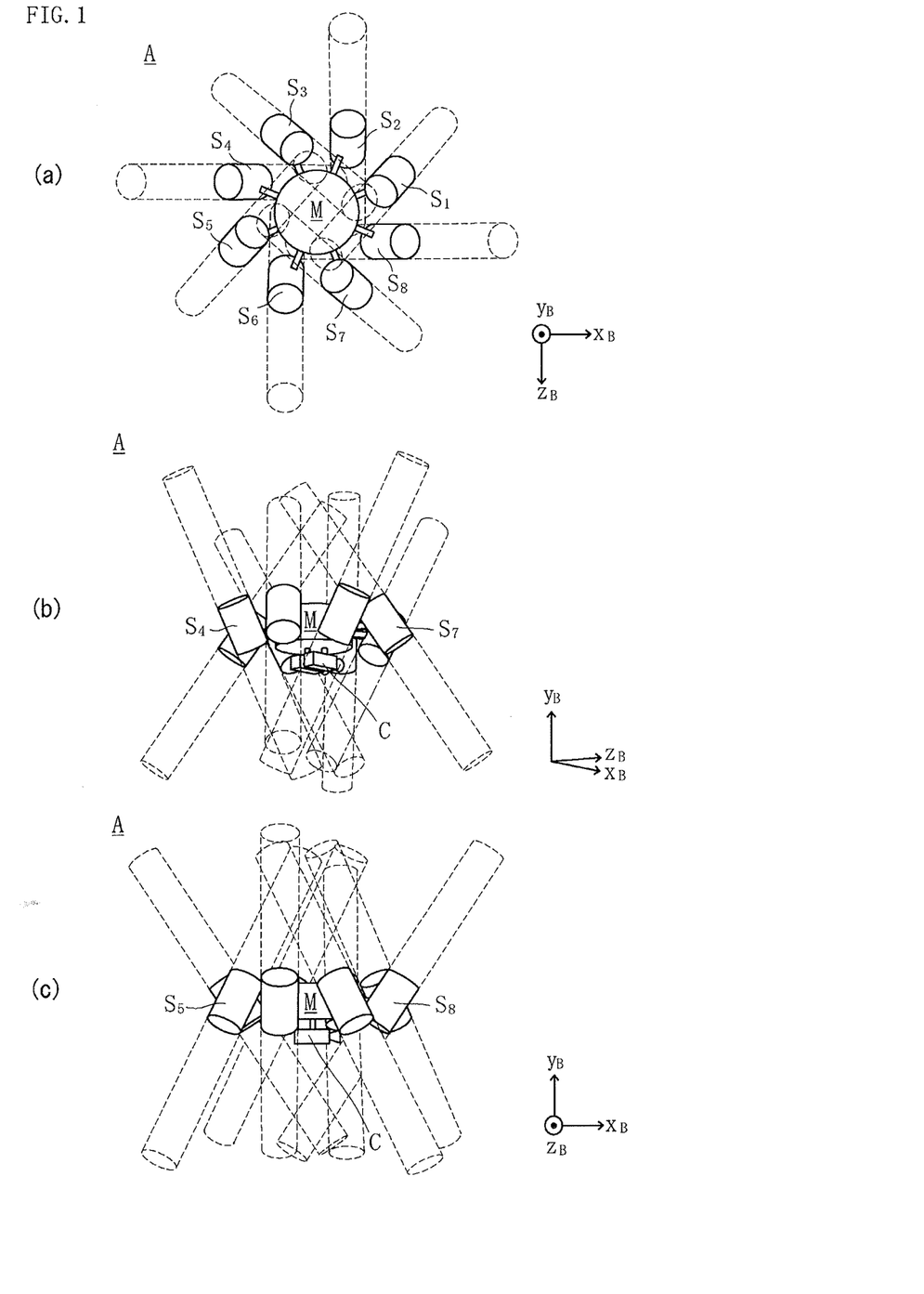
Figure 2:
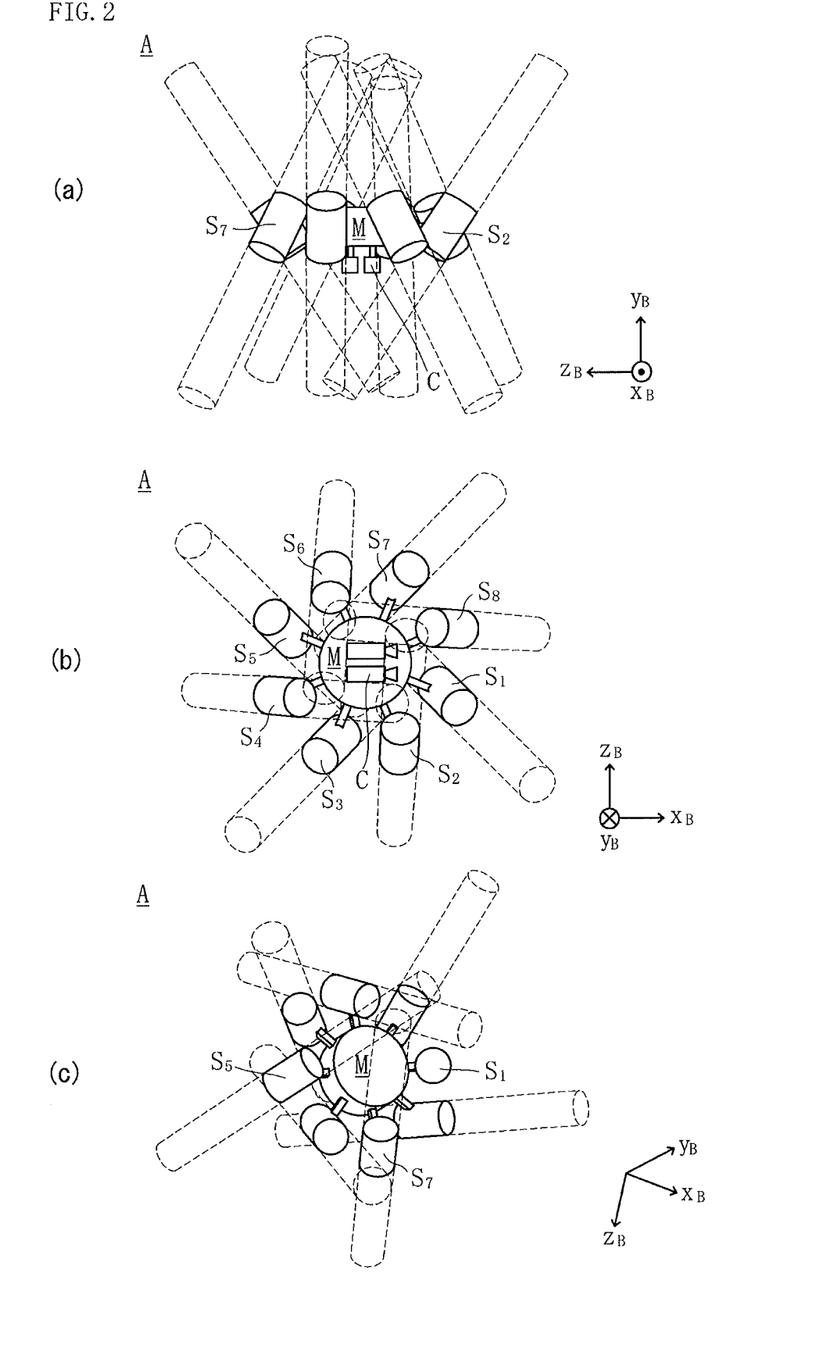

FIGS. 1 and 2 illustrate a floating mobile object A according to a first embodiment of the present invention. In the fuselage coordinate system $\Sigma_B$, the $x_B$-axis represents the front-back direction of the floating mobile object A (where the front is on the positive side), the $y_B$-axis represents the top-bottom direction of the floating mobile object A (where the top is on the positive side), and the $z_B$-axis represents the right-left direction of the floating mobile object A (where the right is on the positive side).

As shown in the figures, the floating mobile object A according to the present embodiment includes a main body M, eight thrusters $S_i$ (where i=1, 2, . . . , 8) for generating thrust, and a pan-tilt camera C.

Ducted fans of the same specifications are used as the eight thrusters $S_i$. The ducted fan is capable of generating thrust in a fixed direction without being affected significantly by disturbance such as wind, and is even capable of, when the fuselage contacts an obstacle, preventing fan blades rotating at high speed from contacting the obstacle directly to be broken. Cylinders depicted by broken lines so as to continue from the thrusters $S_i$ are intake and exhaust airflows to and from the thrusters $S_i$ (corresponding to the "incoming and outgoing flows to and from the thrusters" in the present invention) essentially contributing to thrust generation, and the central axis of each cylinder is the axis of thrust of the thruster $S_i$. Note that to be exact, the incoming and outgoing flows to and from the thrusters $S_i$ are not completely laminar flows, and therefore, unlike in FIGS. 1 and 2, the cylinders do not have a constant diameter, but essentially no problems are caused so long as the flows are spaced apart with reference to a cylinder having a constant diameter, considering margins in accordance with individual characteristics.

Thruster Arrangement

The relationship between the primary thrust vector $^E u_E$ of each thruster $S_i$ and the total thrust vector $u_E$ viewed in the fuselage coordinate system $\Sigma_B$ can be approximated by the following formula.

$$u_E = J_{EB}^{T E} u_E \quad (1)$$

Here, $*^T$ denotes the transpose of the matrix $*$. Moreover, the Jacobian matrix $J_{EB}$ is a constant matrix determined by the geometric arrangement of the thrusters $S_i$ in the fuselage coordinate system $\Sigma_B$.

In this case, the geometric arrangement by which the floating mobile object A is made a holonomic system is defined as below.

$$\mathrm{rank} J_{EB}^T = 6 \quad (2)$$

By arranging the eight thrusters $S_i$ so as to satisfy formula (2), the floating mobile object A can construct a holonomic system capable of generating thrust in every direction (i.e., in three directions of translation along the $x_B$-, $y_B$-, and $z_B$-axes and three directions of rotation about the $x_B$-, $y_B$-, and $z_B$-axes).

However, when the axes of thrust of the thrusters cross one another, as in conventional holonomic floating mobile objects, the intake and exhaust airflows to and from the thrusters $S_i$ interfere with one another, it is highly unlikely that the primary thrust vector $^E u_E$ and the total thrust vector $u_E$ are approximated to a linear relationship as given by formula (1).

Furthermore, when considering a holonomic floating mobile object in the air under gravity which defies gravity mainly by the thrust of the thrusters without depending on flotation, to compensate for low thrust efficiency of the thrusters $S_i$, it is advantageous to direct the primary thrust vector $^E u_E$ of each thruster $S_i$ mainly upward in the vertical direction.

Therefore, in the floating mobile object A according to the present embodiment, the eight thrusters $S_i$ are arranged such that not only formula (2) is satisfied by directing the primary thrust vector $^E u_E$ of each thruster $S_i$ mainly upward in the vertical direction but in slightly different directions from one another, but also the intake and exhaust airflows to and from one of the thrusters $S_i$ are spaced apart from the intake and exhaust airflows to and from the other thrusters $S_i$ and even apart from every other fuselage structure aside from said one thruster $S_i$ (in the present embodiment, including the main body M, the other thrusters $S_i$, and the pan-tilt camera C). For example, to look at the thruster $S_1$, the intake and exhaust airflows to and from the thruster $S_1$ are spaced apart from the intake and exhaust airflows to and from the other thrusters $S_2$ to $S_8$ and even apart from every other fuselage structure aside from the thruster $S_1$, as shown in (c) of FIG. 2. In other words, it can be appreciated from (c) of FIG. 2 that the intake and exhaust airflows to and from the thruster $S_1$ neither cross nor coincide with the intake and exhaust airflows to and from the other thrusters $S_2$ to $S_8$ and do not even cross every other fuselage structure aside from the thruster $S_1$.

More specifically, the eight thrusters $S_i$ are arranged at equal intervals on a circle having a diameter r in the $x_B z_B$ plane having its center at the origin of the fuselage coordinate system $\Sigma_B$ (see (a) of FIG. 1).

The position vector $r_i$ of the thruster $S_i$ is obtained by rotating the position vector to be referenced, $$r = \begin{bmatrix} r \\ 0 \\ 0 \end{bmatrix}, \quad (3)$$

by $\theta_i$ about the $y_B$-axis. In the present embodiment, the angle $\theta_i$ is given by the following.

$$\theta = \begin{bmatrix} \theta_1 \\ \theta_2 \\ \theta_3 \\ \theta_4 \\ \theta_5 \\ \theta_6 \\ \theta_7 \\ \theta_8 \end{bmatrix} = \begin{bmatrix} 1 \\ 3 \\ 5 \\ 7 \\ 9 \\ 11 \\ 13 \\ 15 \end{bmatrix} \frac{\pi}{8} \quad (4)$$

Note that the unit of angle is the radian.

The orientations of the eight thrusters $S_i$ are determined in the fuselage coordinate system $\Sigma_B$ in the following manner.

Specifically, a reference upward thrust axis vector in the fuselage coordinate system $\Sigma_B$, $$f_{axis} = \begin{bmatrix} 0 \\ 1 \\ 0 \end{bmatrix}, \quad (5)$$

is rotated first by $\phi_i$ about the $z_B$-axis, then by $\psi_i$ about the $x_B$-axis, and then by $\theta_i$ about the $y_B$-axis, thereby determining thrust axis vectors $f_{axisi}$ of the eight thrusters $S_i$. In the present embodiment, the angles $\phi_i$ and $\psi_i$ are given by the following.

$$\phi = \begin{bmatrix} \phi_1 \\ \phi_2 \\ \phi_3 \\ \phi_4 \\ \phi_5 \\ \phi_6 \\ \phi_7 \\ \phi_8 \end{bmatrix} = \begin{bmatrix} 30 \\ -30 \\ 30 \\ -30 \\ 30 \\ -30 \\ 30 \\ -30 \end{bmatrix}, \psi = \begin{bmatrix} \psi_1 \\ \psi_2 \\ \psi_3 \\ \psi_4 \\ \psi_5 \\ \psi_6 \\ \psi_7 \\ \psi_8 \end{bmatrix} = \begin{bmatrix} 15 \\ -15 \\ 15 \\ -15 \\ 15 \\ -15 \\ 15 \\ -15 \end{bmatrix} \quad (6)$$

Note that the unit for both of the angles is the degree.

Furthermore, since ducted fans are used as the thrusters $S_i$ in the present embodiment, primary thrust, which is a translational force along the axis of thrust, and secondary thrust, which is a rotational force about the axis of thrust, are generated, and the secondary thrust can be assumed to be in a linear relationship with the primary thrust. In addition, the intake and exhaust airflows to and from all thrusters $S_i$ are spaced apart from one another and even apart from every other fuselage structure aside from that one thruster $S_i$, and therefore, the effect of interference between the intake and exhaust airflows on the thrust is extremely small.

Accordingly, in the floating mobile object A according to the present embodiment, the primary thrust vector $^E u_E$ and the total thrust vector $u_E$ are in a linear relationship, so that formula (1) holds with high accuracy. In addition, it is understood that formula (2) holds by assigning formulas (4) and (6) to the transpose Jacobian matrix $J_{EB}{}^T$.

In the floating mobile object A according to the present embodiment, the thrusters $S_i$ are arranged as described above, such that the range in which the total thrust vector $u_E$ can be generated spans a six-dimensional space with the three directions of translation along the $x_B$-, $y_B$-, and $z_B$-axes and the three directions of rotation about the $x_B$-, $y_B$-, and $z_B$-axes, and the intake and exhaust airflows to and from one of the thrusters $S_i$ are spaced apart from the intake and exhaust airflows to and from the other thrusters $S_i$ and even apart from every other fuselage structure aside from that one thruster $S_i$, and therefore, the total thrust vector $u_E$ can be controlled with high accuracy.

Furthermore, in the floating mobile object A according to the present embodiment, since the thrusters $S_i$ are arranged such that the total thrust vector $u_E$ spans a six-dimensional space by directing the primary thrust vectors $^E u_E$ of the thrusters $S_i$ mainly upward in the vertical direction but in slightly different directions from one another, and the incoming and outgoing flows to and from the thrusters $S_i$ do not interfere with one another, it is possible to compensate for low thrust efficiency of the thruster $S_i$, which is a disadvantage of the holonomic system, and apply high control performance, which is an advantage of the holonomic system, even when the floating mobile object is in the air under gravity and defies gravity mainly by the thrust of the thrusters $S_i$ without depending on flotation.

Floating Mobile System

Figure 3:
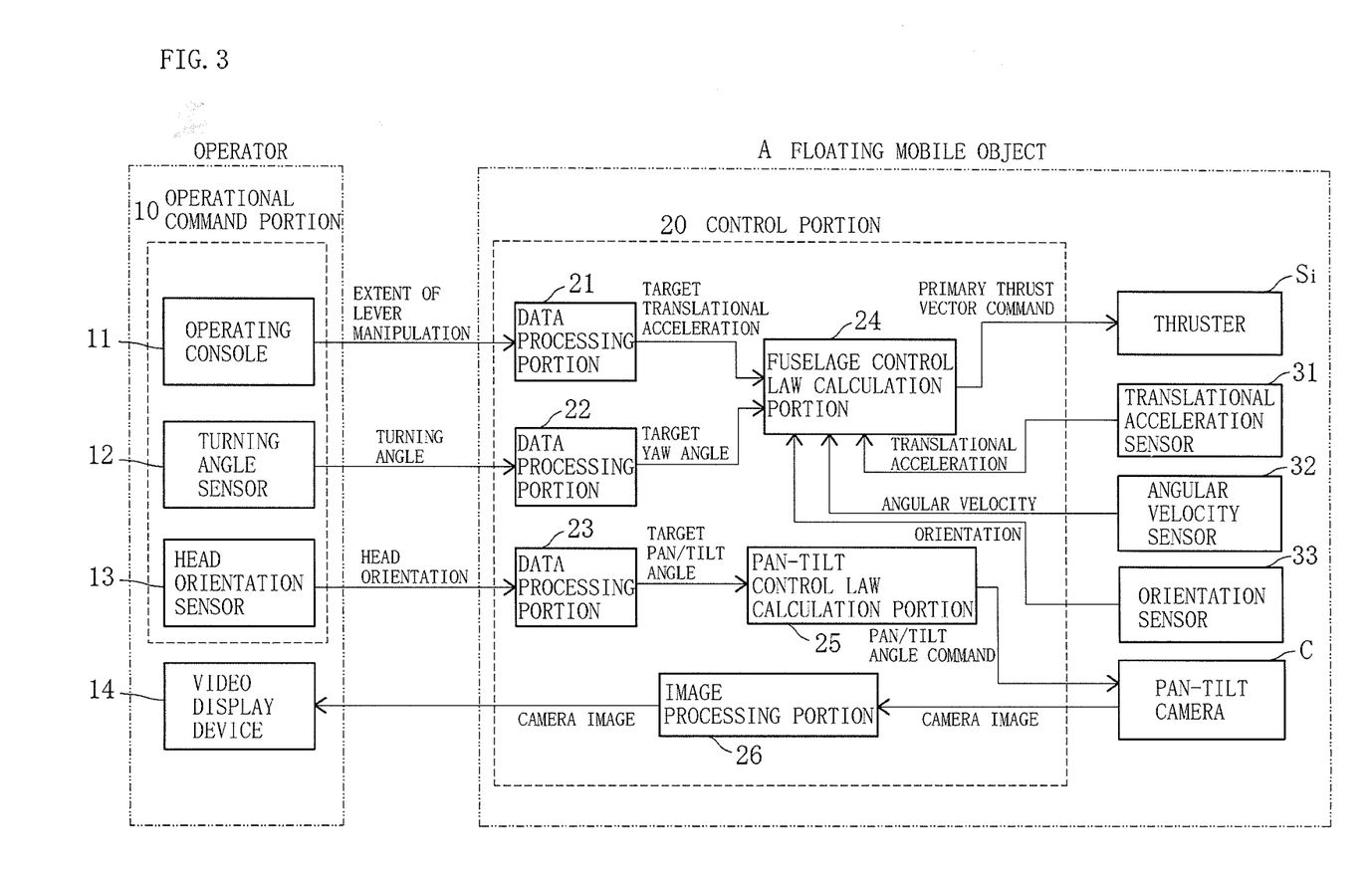
FIG. 3 is a block diagram illustrating an example of a floating mobile system of the present invention.

Next, a floating mobile system using the floating mobile object A will be described with reference to FIGS. 3 and 4. The floating mobile system consists of an operator system, including an operational command portion 10, and a floating mobile object A-side system, including a control portion 20, as shown in FIG. 3. In the present embodiment, the control portion 20 is provided within the main body M of the floating mobile object A, but it can be provided in a place other than within the main body M (e.g., on an operating console 11 in the operational command portion 10).

The operator system includes the operational command portion 10, which consists of input means including the operating console 11 provided with a lever for moving the floating mobile object A in the three directions of translation along the $x_B$-, $y_B$-, and $z_B$-axes, a turning angle sensor 12 for turning the floating mobile object A in a yaw direction (in the direction of rotation about the $y_B$-axis), and a head orientation sensor 13 for adjusting the pivot angle of the pan-tilt camera C, and the operator system further includes a video display device 14 for displaying a video being recorded by the pan-tilt camera C in real-time. Note that the term "real-time" encompasses a slight delay of time if the operator can still perceive the video being displayed in real-time despite such a delay. For example, the "real-time" display can be considered as being provided even when an image processing portion 26 to be described later takes a certain period of time to perform image processing.

Figure 4:
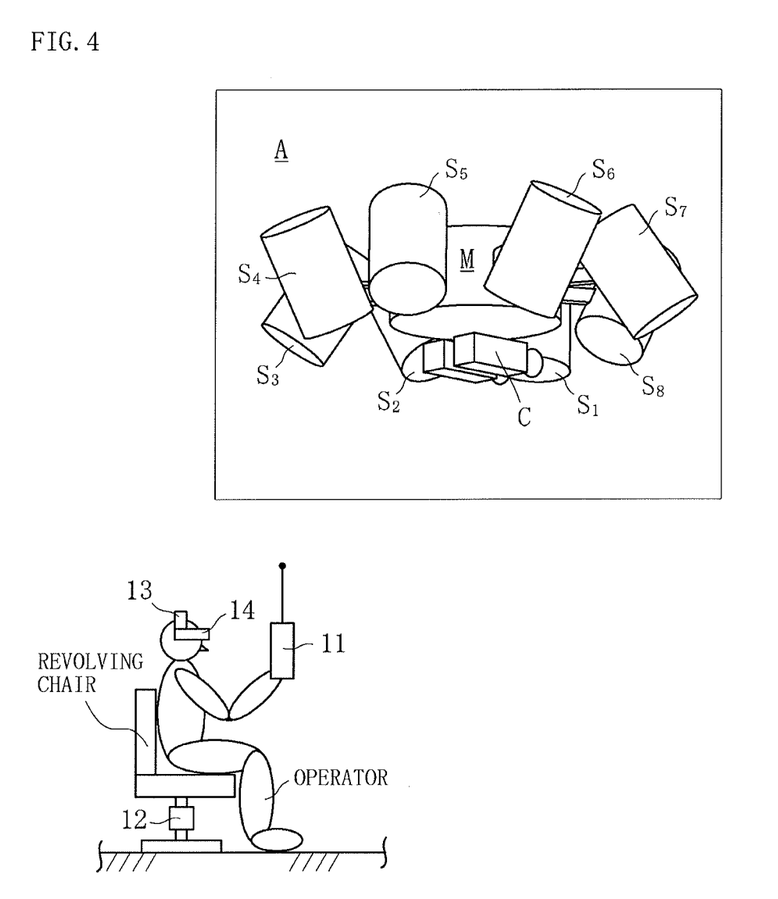
FIG. 4 is a schematic structure view of the floating mobile system in FIG. 3.

The operating console 11 is adapted to be hand-held by the operator for manipulation, and the turning angle sensor 12 is provided on a rotation shaft of a revolving chair on which the operator sits, as shown in FIG. 4. Moreover, the head orientation sensor 13 and the video display device 14 are adapted to be worn on the head of the operator.

Referring again to FIG. 3, in addition to the thrusters $S_i$ and the pan-tilt camera C, the floating mobile object A includes an acceleration sensor (translational acceleration sensor) 31 for measuring the acceleration (translational acceleration) of the floating mobile object A, an angular velocity sensor 32 for measuring the angular velocity of the floating mobile object A, and an orientation sensor 33 for measuring the orientation of the floating mobile object A (i.e., gravitational acceleration as observed from the position of the floating mobile object A).

The control portion 20 includes data processing portions 21 to 23, a fuselage control law calculation portion 24, a pan-tilt control law calculation portion 25, and the image processing portion 26.

The data processing portion 21 decides target translational acceleration for the floating mobile object A on the basis of a command (the extent of lever manipulation) outputted by the operating console 11. The data processing portion 22 decides a target yaw angle for the floating mobile object A on the basis of a measured turning angle outputted by the turning angle sensor 12. Moreover, the data processing portion 23 decides a target pan/tilt angle for the pan-tilt camera C on the basis of a measured head orientation (head inclination) outputted by the head orientation sensor 13.

The pan-tilt control law calculation portion 25 decides a target value (a command value) for the pivot angle of the pan-tilt camera C on the basis of the target pan/tilt angle. As a result, the pan-tilt camera C is controlled such that the pivot angle changes in accordance with a change of the operator's line of sight. Furthermore, the image processing portion 26 performs image processing required for transmitting a video taken by the pan-tilt camera C to the video display device 14, as well as image processing for easy viewing by the operator.

The fuselage control law calculation portion 24 decides a target value (command value) $^E u_{Ed}(t)$ for the primary thrust vector $^E u_E$ for each thruster $S_i$ on the basis of the target translational acceleration, the target yaw angle, and measured values obtained by the sensors 31 to 33 provided in the floating mobile object A.

Incidentally, in the floating mobile object A, the primary thrust vector $^E u_E$ of each thruster $S_i$ and the total thrust vector $u_E$ are in a linear relationship, so that formula (1) holds with high accuracy. Accordingly, formula (1) can be transformed in the following.

$$^E u_{Ed} = J_{EB}^{-T} u_{Ed} + (I - J_{EB}^{+T} J_{EB}^T) \xi \quad (7)$$

Here, $*^{+T}$ denotes the transpose of the pseudo inverse matrix of the matrix $*$, and the vector $\xi$ denotes an arbitrary constant vector. Particularly in the case where the number of thrusters n=6, formula (7) can be expressed as below.

$$^E u_{Ed} = J_{EB}^{-T} u_{Ed} \quad (8)$$

Here, $*^{-T}$ denotes the transpose of the inverse matrix of the matrix $*$.

The primary thrust vector $^E u_{Ed}$ (target value) that is required for obtaining a desired total thrust vector $u_{Ed}$ (target value) in six dimensions can be obtained for each thruster $S_i$ by inverting formula (7) or (8). Accordingly, it can be expected that the total thrust vector $u_E$ becomes equal to the target total thrust vector $u_{Ed}$ by performing control such that the primary thrust of each thruster $S_i$ is given as below.

$$^E u_E = ^E u_{Ed} \quad (9)$$

Formula (7) or (8) requires the target total thrust vector $u_{Ed}$ to be decided. Here, it is assumed that the target total thrust vector $u_{Ed}$ is decided by the following function (control law).

$$u_{Ed} = f_c(x_1, x_2, \ldots) \quad (10)$$

In the case where all independent variables $x_1, x_2, \ldots$, of formula (10) are decided only on the basis of the operator's direct manipulation (using the lever of the operating console 11), the operator is required to have extremely advanced operation skills.

In this regard, in the floating mobile system of the present embodiment, some of the independent variables $x_1, x_2, \ldots$, of formula (10) are decided on the basis of measured values obtained by the sensors 31 to 33 provided in the floating mobile object A, and therefore, it is possible to lower the level of the operation skills required for the operator.

Furthermore, in the floating mobile system of the present embodiment, some of the independent variables $x_1, x_2, \ldots$, of formula (10) are decided on the basis of a measured turning angle outputted by the turning angle sensor 12, and therefore, it is possible to further lower the level of the operation skills required for the operator.

Fuselage Control of Floating Mobile Object

First, the fuselage control of the floating mobile object A in the direction of translation will be described. In the floating mobile system of the present embodiment, to perform the fuselage control of the floating mobile object A in the direction of translation, a thrust transfer gate system including a virtual thrust transfer gate (see, for example, Japanese Patent No. 4742329, the Third Instance section) is constructed. Note that the term "virtual thrust transfer gate" refers to a thrust transfer gate constructed in the floating mobile object A, which is arithmetically divided, for convenience' sake, into a main body part (e.g., a substantial part of the mass of the floating mobile object A) and an effector part (thrusters $S_i$), such that forces and torque applied between the main body part and the effector part, i.e., all of the thrust from the effector part acting on the main body part, can be estimated on the basis of measured values obtained by the translational acceleration sensor 31, etc.

A target virtual gate thrust vector, which corresponds to thrust to be received at the virtual thrust transfer gate from the effector part, is determined as below.

$$\tilde{u}_{Gd} = M_B(a_{Bd} - \hat{g}_B) \quad (11)$$

Variables in formula (11) are defined as follows:
 $\tilde{u}_{Gd}(t) \in \Re^3$ Target virtual gate thrust vector;
 $M_B \in \Re^{3 \times 3}$ Inertial matrix by the mass of the floating mobile object;
 $a_{Bd}(t) \in \Re^3$ Target value for inertial acceleration $a_B(t)$ (target translational acceleration) for the floating mobile object; and
 $\hat{g}_B(t) \in \Re^3$ Estimated value for gravitational acceleration $g_B(t)$ as observed from the position of the floating mobile object.

Furthermore, a target total thrust vector (target total thrust vector in the direction of translation) $^t u_{Ed}(t)$, which is required for realizing the target virtual gate thrust vector in the direction of translation.

$$^t u_{Ed} = \tilde{u}_{Gd} + ^t K_P(\tilde{u}_{Gd} - \hat{u}_G) \quad (12)$$

Variables of formula (12) are defined as follows:
 $^t u_{Ed}(t) \in \Re^3$ Target value for the total thrust vector $u_E(t)$ in the direction of translation;
 $\hat{u}_G(t) \in \Re^3$ Estimated value for the virtual gate thrust vector $\tilde{u}_G(t)$; and
 $^t K_P \in \Re^{3 \times 3}$ Diagonal matrix of proportional control gain.

The estimated values required for calculating formulas (11) and (12) are given as shown below on the basis of measured values obtained by the translational acceleration sensor 31 and the orientation sensor 33 provided in the floating mobile object A.

$$\hat{g}_B = g_{Bs}, \hat{u}_G = M_B a_{gBs} \quad (13)$$

Variables of formula (13) are defined as follows:
 $g_{Bs}(t) \in \Re^3$ Measured gravitational acceleration obtained by the orientation sensor installed in the floating mobile object; and
 $a_{gBs}(t) \in \Re^3$ Measured value obtained by the translational acceleration sensor installed in the floating mobile object.

As described above, the target total thrust vector $^t u_{Ed}(t)$ required for realizing the target translational acceleration $a_{Bd}(t)$ for the floating mobile object A can be obtained on the basis of the measured values obtained by the translational acceleration sensor 31 and the orientation sensor 33. Note that the target translational acceleration $a_{Bd}(t)$ for the floating mobile object A is decided by the data processing portion 21 on the basis of a command (the extent of lever manipulation) outputted by the operating console 11.

Next, the fuselage control of the floating mobile object A in the direction of rotation will be described. In the floating mobile system of the present embodiment, for example, a simple PD control law can be used to perform the fuselage control of the floating mobile object A in the direction of rotation.

The target total thrust vector (target total thrust vector in the direction of rotation) $^r u_{Ed}(t)$ required for realizing a target orientation in the direction of rotation is given as shown below.

$$^r u_{Ed} = {}^r K_P \delta n + {}^r K_D \omega \tag{14}$$

Variables of formula (14) are defined as follows:

$^r u_{Ed}(t) \in \Re^3$ Target value for the total thrust vector $u_E(t)$ in the direction of rotation;

$\omega(t) \in \Re^3$ Angular velocity vector of the floating mobile object;

$^r K_P \in \Re^{3\times3}$ Diagonal matrix of proportional control gain;

$^r K_D \in \Re^{3\times3}$ Diagonal matrix of derivative control gain;

$\delta(t) \in \Re$ Angle of rotation for causing the current orientation of the floating mobile object to coincide with a target orientation simply by a single operation of rotation about an axis of rotation; and $n(t) \in \Re^3$ Unit vector representing the direction of the axis of rotation for causing the current orientation of the floating mobile object to coincide with a target orientation simply by a single operation of rotation about an axis of rotation.

The angle of rotation $\delta(t)$ and the unit vector $n(t)$ required for calculating formula (14) can be obtained readily from the current and target orientations of the floating mobile object A. The current orientation of the floating mobile object A can be obtained from a measured value obtained by the orientation sensor 33, and the target orientation of the floating mobile object A in the yaw direction can be obtained from a measured value obtained by the turning angle sensor 12. Note that in the present embodiment, target orientations in the roll and pitch directions are assumed to be constant (horizontal). Furthermore, the angular velocity vector $\omega(t)$ required for calculating formula (14) can be obtained from a measured value obtained by the angular velocity sensor 32.

As described above, the target total thrust vector $^r u_{Ed}(t)$ required for realizing the target orientation of the floating mobile object A can be obtained on the basis of the measured values obtained by the orientation sensor 33 and the angular velocity sensor 32.

Formulas (12) and (14) can be combined into the formula, $$u_{Ed} = \begin{bmatrix} {}^t u_{Ed} \\ {}^r u_{Ed} \end{bmatrix}, \tag{15}$$

thereby obtaining the control law for the floating mobile object A that corresponds to formula (10).

Furthermore, a fuselage control law can be constructed in the fuselage control law calculation portion 24 on the basis of formula (15) in combination with formula (7) or (8).

Second Embodiment

Next, a floating mobile object according to a second embodiment of the present invention will be described. The floating mobile object according to the second embodiment of the present invention is configured so as to be able to generate thrust in every direction even at the time of thruster failure.

Assuming that the floating mobile object is provided with n thrusters (where n=6+α, and α is a positive integer), consider a case where arbitrary β thrusters stop (where β is a positive integer less than or equal to α). In the following, an effector coordinate system in which forces of primary thrust generated by the thrusters are put together is denoted by $\Sigma_e$, and variables are defined as follows:

$J_{eB}^T \in \Re^{6\times(n-\beta)}$ Transpose Jacobian matrix obtained by removing columns corresponding to the arbitrary β thrusters from $J_{EB}^T$;

$^e u_E(t) \in \Re^{(n-\beta)}$ Preliminary thrust vector obtained by removing elements corresponding to the arbitrary β thrusters from $^E u_E(t)$; and $^e u_{Ed}(t) \in \Re^{(n-\beta)}$ Target value for preliminary thrust vector $^e u_E(t)$.

The relationship between the primary thrust vector $^e u_E$ of each thruster and the total thrust vector $u_E$ as viewed in the fuselage coordinate system $\Sigma_B$ can be approximated by the following formula similar to formula (1).

$$u_E = J_{eB}^{Te} u_E \tag{16}$$

In this case, whichever β thrusters are selected from among the n thrusters, the geometric arrangement by which the floating mobile object is made a holonomic system is defined as below.

$$\mathrm{rank} J_{eB}^T = 6 \tag{17}$$

By arranging the n thrusters such that formula (17) is satisfied regardless of whichever β thrusters are selected, it is rendered possible to construct a holonomic system in which the floating mobile object is capable of generating thrust in every direction even if up to any β of the n thrusters stop at the same time.

Figure 5:
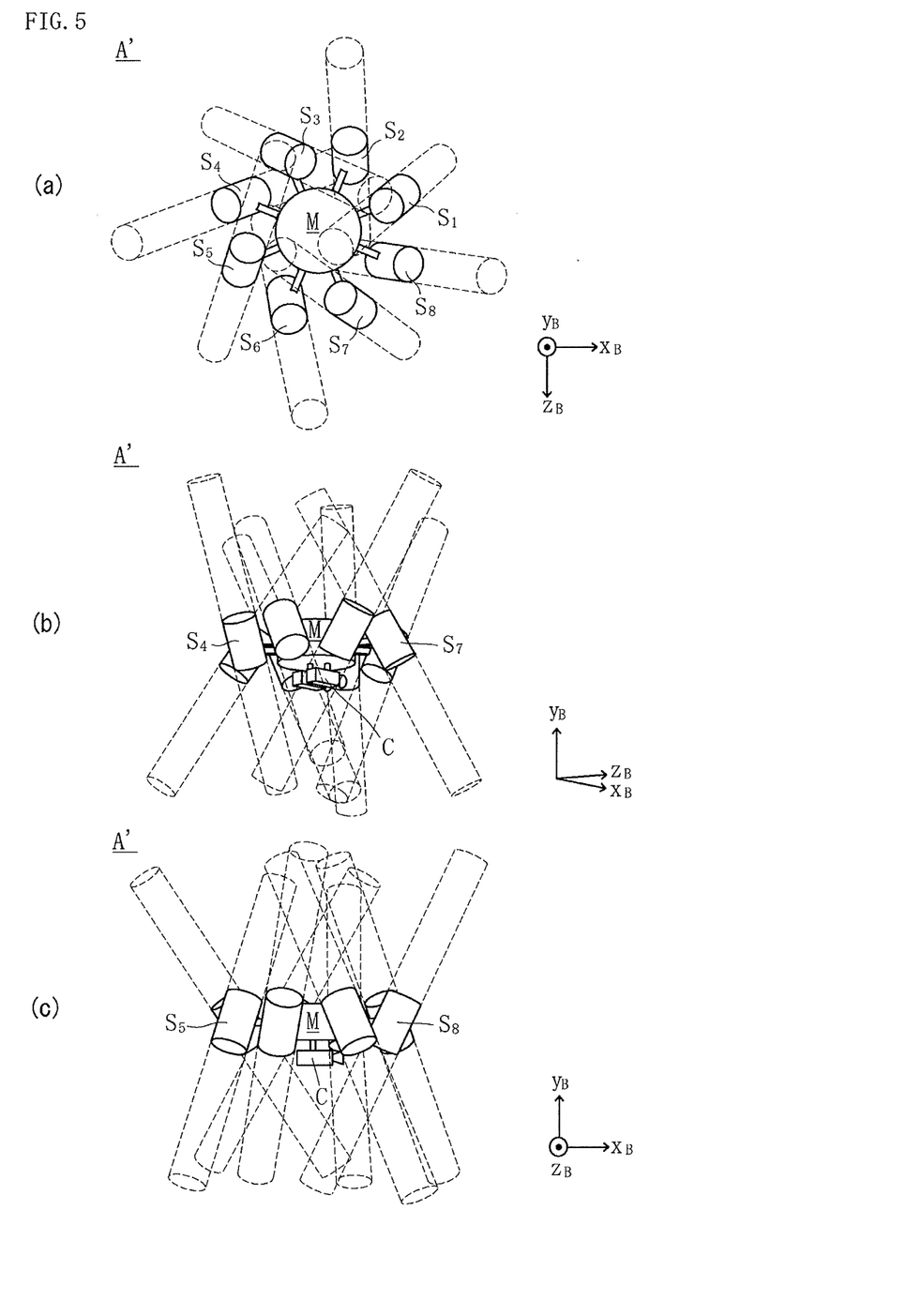
Figure 6:
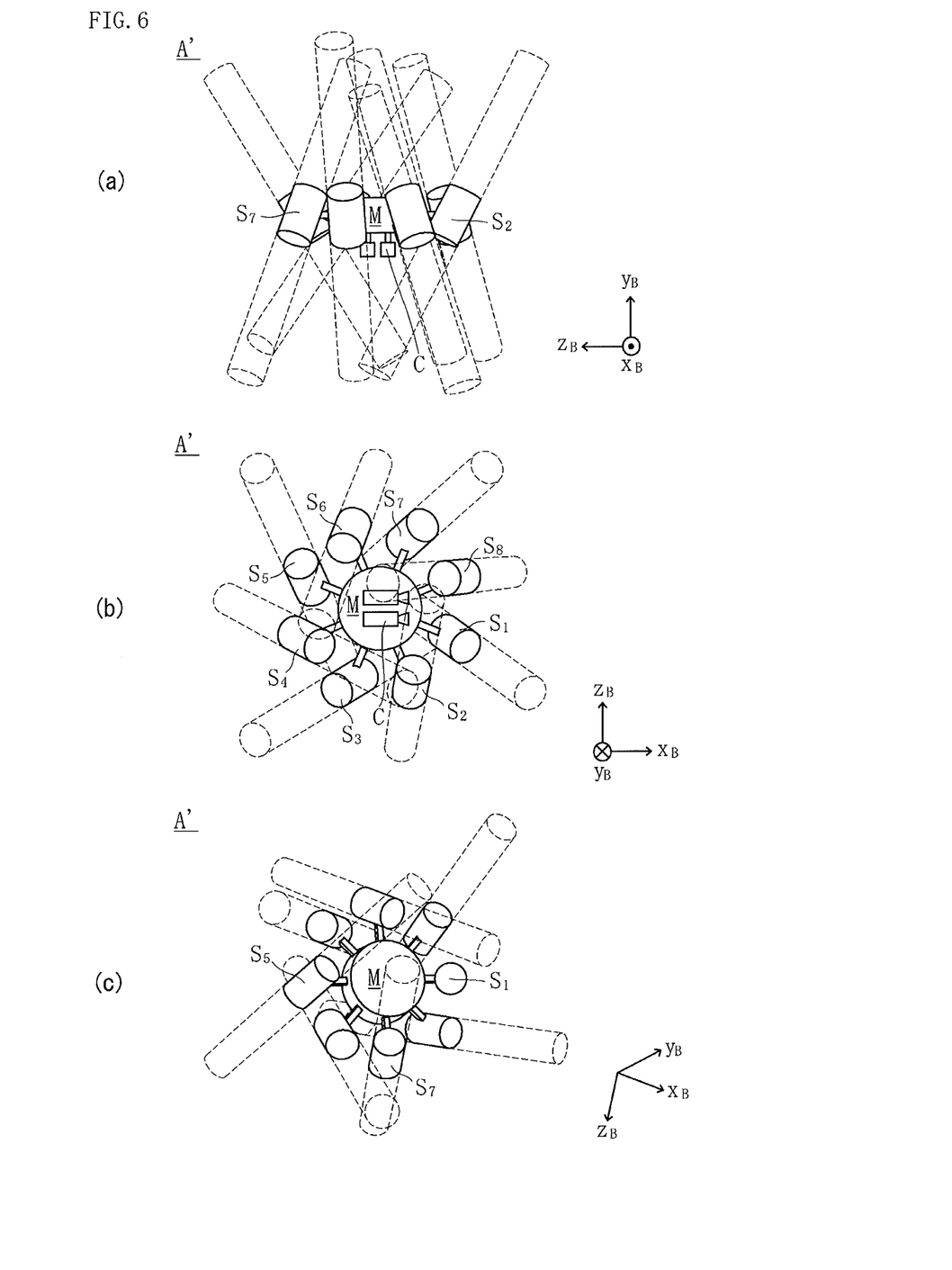

FIGS. 5 and 6 illustrate the floating mobile object A' according to the present embodiment. The floating mobile object A' according to the present embodiment is the same as the floating mobile object A according to the first embodiment except for the installation angles $\phi_i$ and $\psi_i$ of the thrusters $S_1$ to $S_8$.

More specifically, in the present embodiment, the installation angles are as given below.

$$\phi = \begin{bmatrix} \phi_1 \\ \phi_2 \\ \phi_3 \\ \phi_4 \\ \phi_5 \\ \phi_6 \\ \phi_7 \\ \phi_8 \end{bmatrix} = \begin{bmatrix} 24 \\ -24 \\ 24 \\ -24 \\ 24 \\ -24 \\ 24 \\ -24 \end{bmatrix}, \psi = \begin{bmatrix} \psi_1 \\ \psi_2 \\ \psi_3 \\ \psi_4 \\ \psi_5 \\ \psi_6 \\ \psi_7 \\ \psi_8 \end{bmatrix} = \begin{bmatrix} 7 \\ -14 \\ 21 \\ -28 \\ 28 \\ -21 \\ 14 \\ -7 \end{bmatrix} \tag{18}$$

In the floating mobile object A' according to the present embodiment also, the intake and exhaust airflows to and from all thrusters $S_i$ are spaced apart from one another and even apart from every other fuselage structure aside from that one thruster $S_i$, and therefore, the effect of interference between the intake and exhaust airflows on the thrust is extremely small. For example, to look at the thruster $S_i$, it can be appreciated that the intake and exhaust airflows to and from the thruster $S_1$ are spaced apart from the intake and exhaust airflows to and from the other thrusters $S_2$ to $S_8$ and even apart from every other fuselage structure aside from that one thruster $S_j$, as shown in (c) of FIG. 6.

Therefore, in the floating mobile object A' according to the present embodiment, the primary thrust vector $^E u_E$ and the total thrust vector $u_E$ are in a linear relationship, so that formula (1) holds with high accuracy, as in the case of the floating mobile object A according to the first embodiment. In addition, it can be appreciated that formula (2) holds by assigning formulas (4) and (18) to the transpose Jacobian matrix $J_{EB}^T$.

Further, it can be appreciated by calculating the transpose Jacobian matrix $J_{eB}^T$ that, in the floating mobile object A' according to the present embodiment, by disposing the thrusters $S_i$ in such an arrangement as given by formula (18), formula (17) holds for the total thrust vector $u_E$, which is obtained by combining thrust generated by the remaining six or seven thrusters S after arbitrary one or two thrusters $S_i$ have been selected from among all of the thrusters $S_1$ to $S_8$, regardless of the selection (i.e., regardless of whichever one or two thrusters $S_i$ have been selected).

Note that a floating mobile system using the floating mobile object A' according to the present embodiment has the same configuration as the floating mobile system of the first embodiment, and therefore, any description thereof will be omitted herein.

While the preferred embodiments of the floating mobile object according to the present invention and the floating mobile system using the same have been described above, the present invention is not limited to such configurations.

The above embodiments have been described by taking as examples the floating mobile objects A and A' used in the air under gravity, but the present invention can also be applied to, for example, floating mobile objects used under water (submersibles, underwater robots, etc.).

Further, the position vectors $r_i$ and the installation angles $\theta_i$, $\phi_i$, and $\psi_i$ of the thrusters $S_i$, as described in the embodiments, may be changed arbitrarily in accordance with the structure of the floating mobile object, so long as formulas (1) and (2) are satisfied. Still further, in the case where a holonomic system is constructed such that thrust can be generated in every direction even if up to $\beta$ thrusters $S_i$ stop at the same, the position vectors $r_i$ and the installation angles $\theta_i$, $\phi_i$, and $\psi_i$ of the thrusters $S_i$ may be changed arbitrarily in accordance with the structure of the floating mobile object, so long as formulas (16) and (17) are satisfied.

Moreover, in the above embodiments, ducted fans are used as the thrusters $S_i$, but can be changed to, for example, arbitrary propellers, screws, fans, jet engines, rocket engines, etc., so long as the thrusters can generate thrust in specific directions.

Further, in the above embodiments, the pan-tilt camera C is provided on the bottom of the main body M, but the installation position can be changed arbitrarily, and even a camera other than the pan-tilt camera C can be installed. Note that in the case where no cameras, including the pan-tilt camera C, are installed, it is possible to reduce operational complexities by setting the coordinate system in which the floating mobile object is controlled in the reference frame $\Sigma_R$, more specifically, by causing the control portion 20 to perform coordinate conversion from the reference frame $\Sigma_R$ to the fuselage coordinate system $\Sigma_B$ on the operator's operational command in the reference frame $\Sigma_R$.

DESCRIPTION OF THE REFERENCE CHARACTERS

A, A' floating mobile object
C pan-tilt camera
M main body
$S_i$ thruster
10 operational command portion
11 operating console
12 turning angle sensor
13 head orientation sensor
14 video display device
20 control portion
21, 22, 23 data processing portion
24 fuselage control law calculation portion
25 pan-tilt control law calculation portion
26 image processing portion
31 translational acceleration sensor
32 angular velocity sensor
33 orientation sensor

The invention claimed is:

1. A floating mobile object operated under gravity, comprising:
a main body; and
six or more thrusters for generating thrust by changing the momentum of a fluid, wherein,
the six or more thrusters are controlled independently of one another such that the thrust is set at a desired value,
the six or more thrusters are arranged and fixed in a fuselage coordinate system defined on the main body such that primary thrust vectors of all of the thrusters are directed upward, and
in the fuselage coordinate system, a range in which a total thrust vector obtained by combining vectors of the thrust generated by all of the thrusters is generated spans a six-dimensional space with three directions of translation and three directions of rotation, and incoming and outgoing flows to and from one of the thrusters are spaced apart from incoming and outgoing flows to and from the other thrusters.

2. The floating mobile object according to claim 1, wherein,
the number of thrusters provided is $6+\alpha$, $\alpha$ being a positive integer, and
$(6+\alpha-\beta)$ thrusters, $\beta$ being a positive integer less than or equal to $\alpha$, excluding $\beta$ from among the $(6+\alpha)$ thrusters, are arranged such that the range in which the total thrust vector obtained by combining the vectors of the thrust generated by all of the thrusters is generated spans the six-dimensional space regardless of the selection of the $\beta$ thrusters and whichever $\beta$ thrusters are selected.

3. The floating mobile object according to claim 1, wherein the thrust is controlled on the basis of commands outputted by one or more input means and one or more sensors provided in the main body.

4. The floating mobile object according to claim 3, wherein the command outputted by the input means includes an input signal outputted by an operating console manipulated remotely by an operator.

5. The floating mobile object according to claim 3, wherein the command outputted by the sensor includes at least one measured value for the main body's position, orientation, velocity, angular velocity, acceleration, and angular acceleration.

6. The floating mobile object according to claim 3, wherein the command outputted by the input means includes a measured value outputted by a sensor for measuring an orientation of the operator's specific body part.

7. The floating mobile object according to claim 1, further comprising a camera provided on the main body, wherein,
the camera is capable of outputting a video being taken to a video display device used by the operator in real-time.

8. The floating mobile object according to claim 7, wherein the camera is provided pivotably on the main body.

9. The floating mobile object according to claim 8, wherein a pivot angle of the camera is controlled on the basis of a measured value outputted by a sensor for measuring a head orientation of the operator.

10. A floating mobile system using the floating mobile object of claim 1, comprising:
- an operating console manipulated remotely by an operator;
- an acceleration sensor for measuring acceleration of the floating mobile object;
- an orientation sensor for measuring an orientation of the floating mobile object; and
- a control portion for deciding target acceleration for the floating mobile object on the basis of an input signal outputted by the operating console and also deciding a target total thrust vector in a direction of translation for realizing the target acceleration, on the basis of measured values outputted by the acceleration sensor and the orientation sensor, wherein,
- the thrusters are controlled independently of one another such that the total thrust vector matches the target total thrust vector in the direction of translation.

11. The floating mobile system according to claim 10, further comprising:
- a turning angle sensor for measuring an orientation of the operator's specific body part; and
- an angular velocity sensor for measuring an angular velocity of the floating mobile object, wherein,
- the control portion decides a target orientation for the floating mobile object on the basis of a measured value outputted by the turning angle sensor and also decides a target total thrust vector in a direction of rotation for realizing the target orientation, on the basis of measured values outputted by the angular velocity sensor and the orientation sensor, and
- the thrusters are controlled independently of one another such that the total thrust vector matches a target total thrust vector obtained by combining the target total thrust vectors in the directions of translation and rotation.

* * * * *